(12) United States Patent
Aoki et al.

(10) Patent No.: US 9,087,077 B2
(45) Date of Patent: Jul. 21, 2015

(54) IN-VEHICLE ELECTRONIC CONTROL DEVICE

(75) Inventors: Yuho Aoki, Tokyo (JP); Shuji Endo, Tokyo (JP); Kenichi Okamoto, Tokyo (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/520,870

(22) PCT Filed: May 30, 2012

(86) PCT No.: PCT/JP2012/003546
§ 371 (c)(1),
(2), (4) Date: Feb. 27, 2014

(87) PCT Pub. No.: WO2013/001716
PCT Pub. Date: Jan. 3, 2013

(65) Prior Publication Data
US 2014/0164826 A1      Jun. 12, 2014

(30) Foreign Application Priority Data

Jun. 29, 2011  (JP) ................................. 2011-144690

(51) Int. Cl.
| | |
|---|---|
| G06F 11/00 | (2006.01) |
| G06F 11/30 | (2006.01) |
| G06F 11/07 | (2006.01) |
| G06F 11/16 | (2006.01) |

(52) U.S. Cl.
CPC ........ *G06F 11/3024* (2013.01); *G06F 11/0721* (2013.01); *G06F 11/0739* (2013.01); *G06F 11/0757* (2013.01); *G06F 11/1641* (2013.01); *G06F 11/3013* (2013.01); *G06F 11/3055* (2013.01)

(58) Field of Classification Search
USPC .................................................. 714/39, 47.1
See application file for complete search history.

(56) References Cited

U.S. PATENT DOCUMENTS

| | | | |
|---|---|---|---|
| 6,356,821 | B1 | 3/2002 | Yoshida |
| 2004/0153886 | A1 | 8/2004 | Schumacher et al. |

(Continued)

FOREIGN PATENT DOCUMENTS

| | | |
|---|---|---|
| EP | 0 556 805 A2 | 8/1993 |
| JP | 2-44436 A | 2/1990 |

(Continued)

OTHER PUBLICATIONS

Japanese Office Action dated Jul. 2, 2012 with English translation (eight (8) pages).

(Continued)

*Primary Examiner* — Sarai Butler
(74) *Attorney, Agent, or Firm* — Crowell & Moring LLP (57) ABSTRACT

An in-vehicle electronic control device for diagnosing the details of an abnormality of a microcomputer appropriately is provided. A monitoring function for detecting a malfunction by monitoring input/output of a main function of a hardware part and a monitoring function for detecting an abnormality by monitoring the calculating result of a main function in a software part are provided in a microcomputer. The main function to be monitored is implemented with a different structure than the malfunction/abnormality monitoring function. Furthermore, a malfunction processing circuit for monitoring an abnormality of the microcomputer is provided outside the microcomputer.

9 Claims, 4 Drawing Sheets

(56) References Cited

U.S. PATENT DOCUMENTS

| | | | |
|---|---|---|---|
| 2005/0034016 A1* | 2/2005 | Ferrand et al. | 714/23 |
| 2007/0174720 A1* | 7/2007 | Kubo et al. | 714/42 |
| 2009/0049336 A1* | 2/2009 | Hara | 714/10 |
| 2009/0183023 A1* | 7/2009 | Rathunde et al. | 714/4 |
| 2010/0174967 A1 | 7/2010 | Funaki et al. | |
| 2012/0166041 A1* | 6/2012 | Takehisa | 701/36 |
| 2012/0166879 A1* | 6/2012 | Watanabe et al. | 714/37 |
| 2013/0117605 A1* | 5/2013 | Ziegler et al. | 714/15 |

FOREIGN PATENT DOCUMENTS

| | | |
|---|---|---|
| JP | 4-326410 A | 11/1992 |
| JP | 5-233344 A | 9/1993 |
| JP | 5-324409 A | 12/1993 |
| JP | 6-161798 A | 6/1994 |
| JP | 6-274361 A | 9/1994 |
| JP | 8-171507 A | 7/1996 |
| JP | 2001-63492 A | 3/2001 |
| JP | 2004-514215 A | 5/2004 |
| JP | 2005-92621 A | 4/2005 |
| JP | 2005-227873 A | 8/2005 |
| JP | 2006-344086 A | 12/2006 |
| JP | 2008-299767 A | 12/2008 |
| JP | 2009-252104 A | 10/2009 |
| JP | 2010-160649 A | 7/2010 |
| JP | 2010-262432 A | 11/2010 |

OTHER PUBLICATIONS

Japanese-language Search Report (PCT/ISA/237) dated Jul. 3, 2012 (five (5) pages).

Japanese-language International Search Report (PCT/ISA/210) dated Jul. 3, 2012 (three (3) pages).

Japanese Office Action with English Translation dated Oct. 1, 2013 (six (6) pages).

Japanese Office Action with English Translation dated Oct. 1, 2013 (eight (8) pages).

English translation of document C3 (International Search Report (PCT/ISA/210) previously filed on Aug. 1, 2012 (two (2) pages).

English translation of Document C2 (Japanese-language Written Opinion (PCT/ISA/237)) previously filed on Aug. 1, 2012 (seven (7) pages).

Chinese Office Action dated Jul. 2, 2014, with English translation (Thirteen (13) pages).

* cited by examiner

FIG. 7

IN-VEHICLE ELECTRONIC CONTROL DEVICE

TECHNICAL FIELD

The present invention relates to an in-vehicle electronic control device having a function of monitoring malfunction or abnormality of a microcomputer.

BACKGROUND ART

A technology of a conventional in-vehicle electronic control device having a CPU monitoring function is disclosed in Patent Documents 1 and 2, for example. This technology adopts a lockstep system as the above-mentioned monitoring function, which has a collation circuit for collating the processing results of two information processing units: systems A and B, each having an identical configuration. If the collation results from the collation circuit do not agree with each other, either system A or B is determined inoperative Moreover, a configuration having two different CPUs: a control CPU and a monitoring CPU for the above-mentioned monitoring function and adopting a system that the control CPU is monitored by the monitoring CPU has been adopted (e.g., see Patent Document 3).

PRIOR ART DOCUMENTS

Patent Documents

Patent Document 1: JP 2010-262432 A
Patent Document 1: JP 2010-160649 A
Patent Document 3: JP 2006-344086 A

SUMMARY OF THE INVENTION

Problems to be Solved

However, the monitoring function that has adopted the above-mentioned lockstep system cannot detect an abnormality when the control unit and the monitoring unit uses the same core, even if a computing core unit malfunctions, such as outputting an erroneous calculation result. Moreover, the monitoring function that uses two different CPUs described above cannot diagnose the control CPU's calculation precisely.

Thus, since it is impossible to conduct precise diagnosis of abnormality, the CPUs are always halted irrespective of type of abnormality whenever it occurs. However, in light of driver's increased burdens due to vehicles increasing in size while the CPUs are being halted, and standardization of safety control protocols for vehicles, etc., control by the CPUs should be continued for a type of abnormality even when it occurs.

The present invention thus aims to provide an in-vehicle electronic control device for diagnosing abnormalities of a microcomputer appropriately.

Solution to the Problems

In order to resolve the above problem, a first aspect of an in-vehicle electronic control device according to the present invention is characterized in that it includes a hardware part and a software part, a microcomputer for generating a driving signal for driving an actuator based on a signal detected by a sensor installed in a vehicle, a hardware element monitoring unit that is deployed in the microcomputer and monitors abnormality of each element of the hardware part, a software element monitoring unit that is deployed in the microcomputer and monitors abnormality of each element of the software part, and an external monitoring unit that is deployed outside the microcomputer and monitors abnormality of the microcomputer.

As such, the present invention can diagnose detailed abnormalities of a microcomputer by overall monitoring using three units of a hardware element monitoring unit, a software element monitoring unit that and an external monitoring unit. Therefore, it is possible to take a suitable action according to the details of an abnormality of the microcomputer when the abnormality has occurred.

A second aspect of the present invention is characterized in that the hardware element monitoring unit has a different configuration from that of a to-be-monitored hardware element, comprises a monitoring hardware element that has the same input/output characteristics as the to-be-monitored hardware element, and compares an output signal from the to-be-monitored hardware element and that from the monitoring hardware element when an identical signal is input to both of the to-be-monitored hardware element and the monitoring hardware element, so as to monitor abnormality of the to-be-monitored hardware element.

Since the input/output of the monitored hardware element is monitored in this manner, a malfunction of the monitored hardware element may be detected appropriately.

Furthermore, since the monitoring hardware element is implemented with a different structure from the monitored hardware, element, delay time up to completion of processing may be different therebetween, for example.

As a result, even malfunction factors influencing both of them may be detected appropriately as malfunction.

A third aspect of the present invention is characterized in that when the hardware element monitoring unit detects the abnormality, the hardware element monitoring unit takes a stop measure for halting the actuator.

In this manner, a suitable measure may be taken according to details of an abnormality of the microcomputer.

A fourth aspect of the present invention is characterized in that when the hardware element monitoring unit detects the abnormality, the hardware element monitoring unit notifies the abnormality to the external monitoring unit; and the external monitoring unit receives the notification of the abnormality from the hardware element monitoring unit, and the external monitoring unit takes a stop measure for halting the actuator.

In this manner, once an abnormality is detected, the direct means for halting the actuator and means for halting the actuator via the external monitoring unit are used together, thereby making the means for halting redundant. Consequently, the actuator can be halted surely once an abnormality occurs.

A fifth aspect of the present invention is characterized in that the software element monitoring unit has a different configuration from that of a to-be-monitored software element, has a monitoring software element for the same computing as the to-be-monitored software element, inputs the same signal to the to-be-monitored software element and the monitoring software element, and monitors an abnormality of the to-be-monitored software element by determining whether difference between the calculated results from both the to-be-monitored software element and the monitoring software element falls within a permissible range.

In this manner, since the calculating result of the monitored software element is monitored, an abnormality of the software element may be detected appropriately. Furthermore, since the monitoring software element is implemented with a different structure than the monitored software element, instructions, for example, used for calculation may be different between the elements. Consequently, even though the abnormal factors influencing both of the elements may be detected as an abnormality appropriately. Moreover, since a predetermined permissible range is set up for comparing the calculating results, an abnormality diagnosis in light of a calculation error generated due to the different implementation may be carried out.

A sixth aspect of the present invention is characterized in that the permissible range is a range in which the calculating result of the monitored software element and calculating result of the monitoring software element have the same sign, and where absolute value of the calculating result of the monitored software element is smaller than that of the calculating result of the monitoring software element.

Therefore, in light of the smaller the absolute value of the calculating result of the monitored software element, the less the actual control action of the actuator, which is hard to lead to an action for causing a malfunction, a permissible range allowing an abnormality to be regarded as not detected may be set up. Consequently, excessive abnormality diagnosis may be prevented.

A seventh aspect of the present invention is characterized in that the software element monitoring unit comprises a restriction unit for restricting the computing result of the monitored software element within the permissible range once the abnormality is detected.

Therefore, even if there is an abnormality with the microcomputer, drive-control of the actuator may be continued as long as the abnormality is of a software element. In this manner, a suitable measure can be performed according to details of an abnormality of the microcomputer.

An eighth aspect of the present invention is characterized in that the external monitoring unit monitors a clock of the microcomputer, so as to monitor abnormality of the microcomputer.

In this manner, once a clock abnormality influencing every functions of the microcomputer occurs but even if the microcomputer cannot diagnose a malfunction or an abnormality, this may be detected as an abnormality. Therefore, reliable abnormality diagnosis may be performed.

A ninth aspect of the present invention is characterized in that the external monitoring unit monitors activity of the hardware element monitoring unit and activity of the software element monitoring unit, so as to monitor abnormality of the microcomputer.

In this manner, when the hardware element monitoring unit itself is not operating, or when the software element monitoring unit itself is not operating, this may be detected as an abnormality. Therefore, reliable abnormality diagnosis may be performed.

A tenth aspect of the present invention is characterized in that once the external monitoring unit detects the abnormality, the external monitoring unit takes measure to halt the actuator.

Therefore, a suitable measure may be taken according to details of an abnormality of the microcomputer.

Advantageous Effects of the Invention

The in-vehicle electronic control device according to the present invention is capable of comprehensively monitoring the hardware and software of a microcomputer and the exterior of the same, so as to diagnose abnormalities of the same appropriately. As a result, a suitable measure according to abnormalities may be taken.

DESCRIPTION OF EMBODIMENTS

Embodiments of the present invention will now be described with reference to the drawings.

Figure 1:
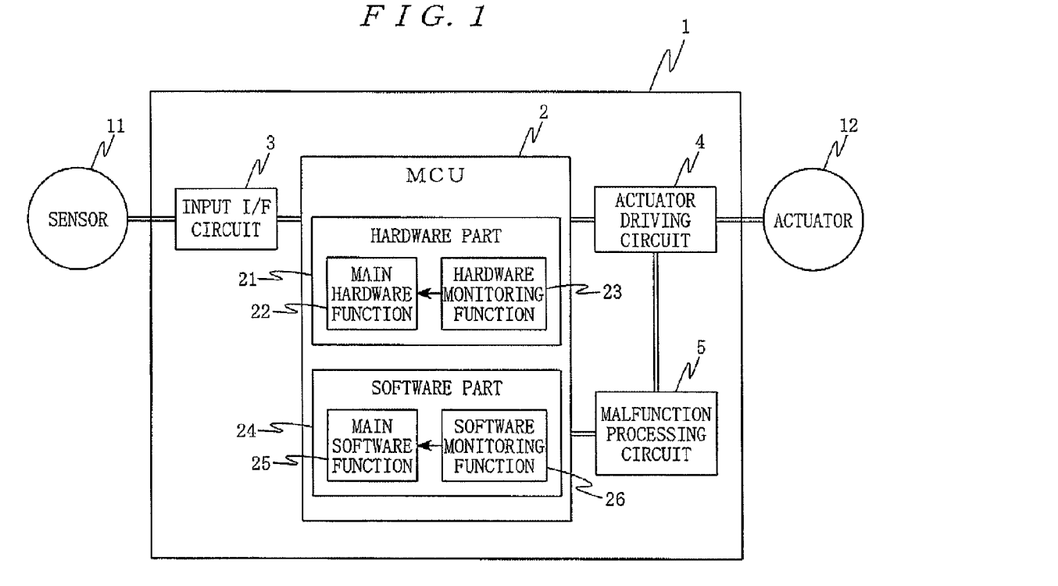
FIG. 1 is a view showing a function of an in-vehicle electronic control device according to an embodiment.

FIG. 1 is a block diagram showing functions of an in-vehicle electronic control device according to an embodiment.

Reference numeral 1 is an in-vehicle electronic control device for controlling a vehicle, and is equipped with a microcomputer (MCU) 2. The MCU 2 is constituted by a hardware part 21 and a software part 24.

The hardware part 21 includes multiple MCU internal elements and a monitoring function 23 for monitoring a malfunction of a main function 22 of these internal elements; wherein, the MCU internal elements include a central processing unit (CPU), a bus, ROM, RAM, a peripheral circuit (a timer, a serial communication unit, a CAN communication unit, an external output port), etc. Moreover, the software part 24 includes software elements and a monitoring function 26 for monitoring abnormalities of a computing processing of the software elements executed by a main function 25.

That is, the software elements and the hardware elements are monitored by the MCU 2.

A variety of signals detected by various sensors 11 deployed in the vehicle are input to the MCU 2 via an input I/F circuit 3. The MCU 2 calculates an instruction signal for drive-control of actuators 12 (such as a brake actuator and an active suspension) deployed in the vehicle, based on the input detected signal, and outputs it to an actuator driving circuit 4.

The actuator driving circuit 4 is constituted by a bridge circuit (FET), a FET drive circuit, a relay, a relay drive circuit etc., so as to drive-control the actuators 12 based on the instruction signal calculated by the MCU 2.

Moreover, the in-vehicle electronic control device 1 includes a malfunction processing circuit 5, which is deployed outside the MCU 2, monitoring malfunction of the MCU 2.

Note that in FIG. 1, the monitoring function corresponds to a hardware element monitoring function, the monitoring function 26 corresponds to a software element monitoring function, and the malfunction processing circuit 5 corresponds to an external monitoring function.

Next, the monitoring function 23 of the hardware part 21 of the MCU 2 will be explained in detail.

Figure 2:
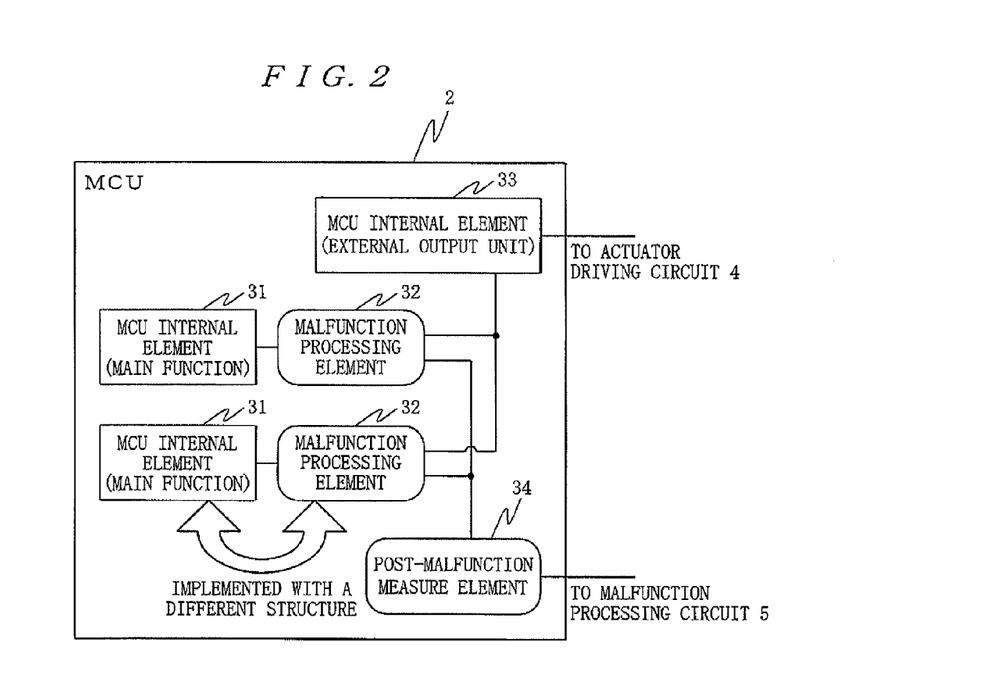
FIG. 2 is a block diagram showing a monitoring function of a hardware element.

FIG. 2 is a block diagram explaining the monitoring function 23 of the hardware part 21 of the MCU 2. As illustrated in FIG. 2, a malfunction processing element 32 is arranged as the monitoring function 23 for every MCU internal element (main function) 31. Herein, the MCU internal element 31 and the malfunction processing element 32 are each implemented with a different structure.

Figure 3:
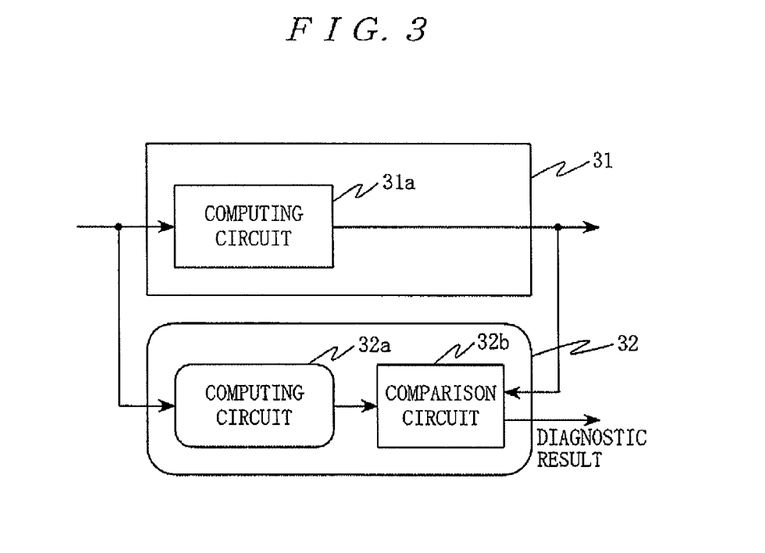
FIG. 3 is a block diagram showing an example of diagnosis of an MCU internal element.

The malfunction processing element 32 monitors input/output of the MCU internal element 31, and determines whether the MCU internal element 31 is inoperative. Herein, as shown in FIG. 3, the malfunction processing element 32 includes a computing circuit 32a and a comparison circuit 32b. The computing circuit 32a is implemented in a different way from the computing circuit 31a, which constitutes the MCU internal element 31 to be monitored, and has the same input/output behavioral characteristics as the computing circuit 31a.

That is, the computing circuit 32a outputs the same signal as that from the computing circuit 31a when its function is normal and the computing circuit 32a has received the same signal as that from the computing circuit 31a. The computing circuit 32a is implemented with a different number of transistors than the computing circuit 31a. Computing for malfunction processing may be simplified more than computing in the main function because only calculation of a value for diagnosis is required. Therefore, the computing circuit 32a has a simpler configuration with a different number of transistors than the computing circuit 31a.

A signal input to the computing circuit 31a is also input to the computing circuit 32a, and the output signal thereof is input to the comparison circuit 32b. The comparison circuit 32b compares the output signal from the computing circuit 31a to that from the computing circuit 32a. If they are different from each other, it is determined that the MCU internal element is inoperative, and the malfunction processing element 32 notifies an MCU internal element (external output function) 33 and a post-malfunction measure element 34 in FIG. 2 of the diagnostic result or to the effect that a malfunction has been detected.

The MCU internal element 33 receives the diagnostic result from the malfunction processing element 32, and outputs an instruction for a post-malfunction measure to the actuator driving circuit 4.

The instruction for the post-malfunction measure may be, for example, a stop signal to a FET drive circuit of a bridge circuit, which constitutes the actuator driving circuit 4. In this case, outputting the stop signal makes all FETs turn off, thereby halting the actuator 12. Moreover, as another example of the instruction for the post-malfunction measure, there is a stop signal to the relay drive circuit of the actuator driving circuit 4. In this case, outputting the stop signal makes the relay turn off, thereby stopping electric power supply to the actuator 12. In such a manner in this embodiment, halting the actuator 12 is applied as a post-malfunction measure.

Moreover, the post-malfunction measure element 34 receives the diagnostic result from the malfunction processing element 32, and notifies the malfunction processing circuit 5 of malfunction information of the MCU internal element 31. Once the malfunction processing circuit 5 receives the malfunction information from the post-malfunction measure element 34, it then outputs an instruction for the post-malfunction measure to the actuator driving circuit 4.

In other words, such a redundant notification means is capable of outputting an instruction for the post-malfunction measure to the actuator driving circuit 4 surely even when either the MCU internal element 33 or the post-malfunction measure element 34 has lost a notification function.

Next, the monitoring function 26 of the software part 24 in the MCU 2 will be explained in detail.

Figure 4:
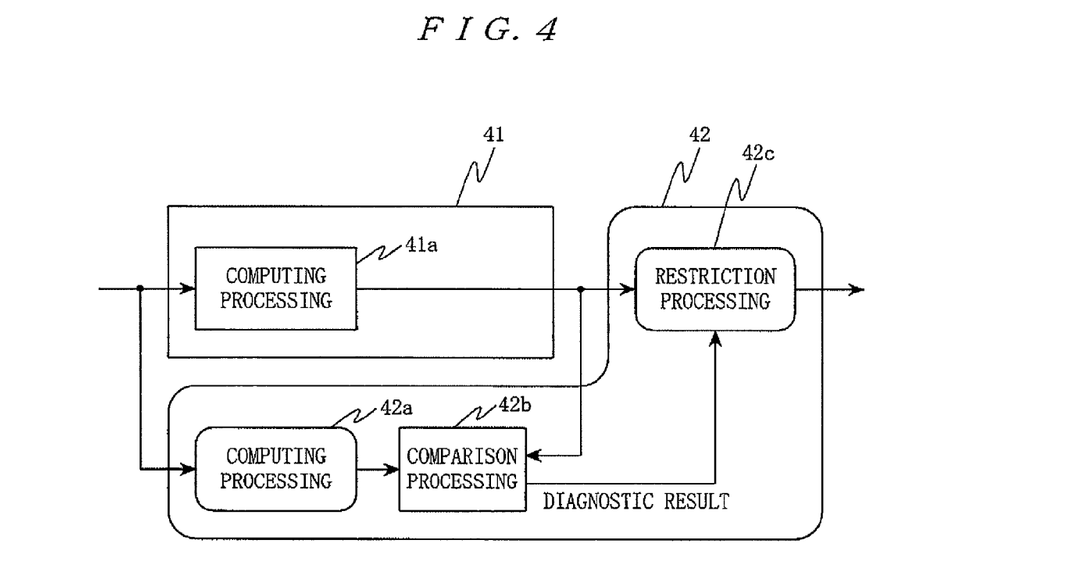
FIG. 4 is a block diagram showing an example of diagnosis of a software element.

FIG. 4 is a block diagram showing an example of diagnosis of a software element. As shown in FIG. 4, a software element (main function) 41 includes abnormality processing software 42 as the monitoring function 26; wherein the software element 41 is implemented with a different structure from the abnormality processing software 42.

The abnormality processing software 42 monitors the calculating result of the software element 41, which is monitored, and determines whether an abnormality has occurred in the software element. The abnormality processing software 42 includes a computing processing 42a, comparison processing 42b, and restriction processing 42c. The computing processing 42a is implemented differently from the computing processing 41a of the software element 41, which is monitored, and carries out the same calculation as the computing processing 41a.

In other words, the computing processing 42a carries out an equivalent calculation of the computing processing 41a in equation with a different number of instructions than those of the computing processing 41a. Computing for malfunction processing may be simplified more than the main functional processing because only calculation of a value for diagnosis is required. Therefore, the computing processing 42a has a simpler configuration with a different number of instructions than the computing processing 41a.

A signal input to the computing processing 41a is input to the computing processing 42a, and the calculating result is input to the comparison processing 42b. The comparison processing 42b compares the calculating result from the computing processing 41a to the calculating result from the computing processing 42a. If the resulting difference does not fall within a predetermined permissible range, it is determined that an abnormality has occurred in the software element 41.

Figure 5:
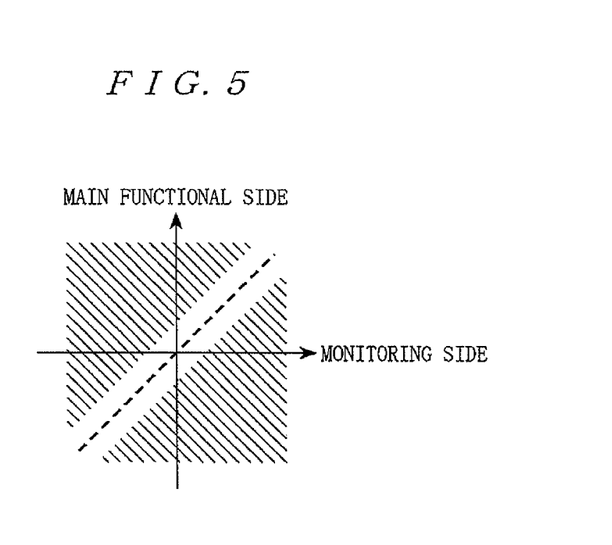
FIG. 5 is a graph showing an example of an abnormality diagnosed domain.

That is, as illustrated in FIG. 5, a zone where the value on the main functional side (the result from the computing processing 41a) relative to value on the monitoring side (the result from the computing processing 42a) falls between a negative and a positive predetermined value is defined as a tolerant zone, and the remaining zone indicated by slanting lines is defined as an abnormality diagnosed zone. If a point determined based on the value on the main functional side and that on the monitoring side falls within the abnormality diagnosed zone, it is determined that the above-mentioned difference does not fall within the permissible range. Note that a straight line indicated by a broken line in FIG. 5 denotes a zone where the value on the main functional side is equal to value on the monitoring side.

As such, setting up a predetermined permissible range allows determination of whether there is an abnormality in light of the computation difference due to the simplified computing processing 42a.

Figure 6:
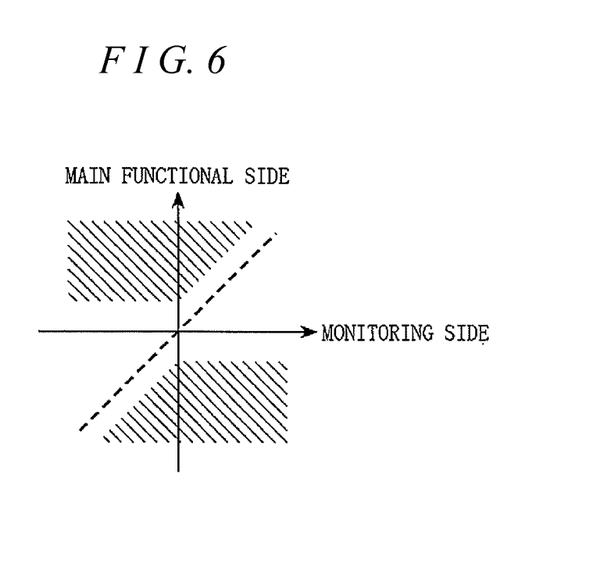
FIG. 6 is a graph showing an example of an abnormality diagnosed domain.

Moreover, the abnormality diagnosed zone may be set up in the manner as shown in FIG. 6, for example. In this example, a tolerant zone is an area with a negative and a positive predetermined permissible range in which the value on the main functional side and value on the monitoring side have the same sign, and the area has a smaller absolute value on the main functional side than absolute value on the monitoring side. That is, if a point determined based on the values on the main functional side and the monitoring side falls within an abnormality diagnosed zone indicated by slanting lines in FIG. 6, it is determined that the above-mentioned difference does not fall within the permissible range. Therefore, since small actual values denote a low possibility of leading to development of malfunction and will thus be acceptable, excessive abnormality diagnosis may be prevented.

Once the comparison processing 42b detects an abnormality in the software element 41, the diagnostic result is output to the restriction processing (restriction unit) 42c of FIG. 4.

The calculating result from the computing processing 41a is input to the restriction processing 42c. When the diagnostic result to the effect that an abnormality is detected is input from the comparison processing 42b, the restriction processing 42c restricts the calculating result from the computing processing 41a to a limited value, and outputs the limited value. It is desirable to set up the limited value by verifying a vehicle permissible range experimentally. Meanwhile, when the diagnostic result to the effect that an abnormality has been detected is not input from the comparison processing 42b, the restriction processing 42c outputs the calculating result from the computing processing 41a as it is.

Figure 7:
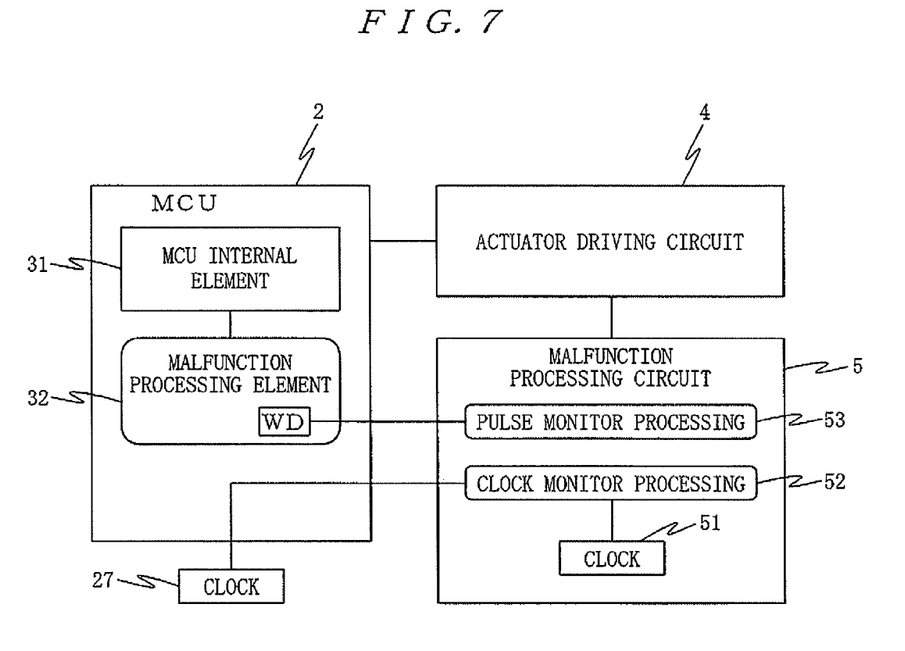
FIG. 7 is a block diagram showing a configuration of a malfunction processing circuit.

Next, a configuration of the malfunction processing circuit 5 will be explained in detail.

FIG. 7 is a block diagram showing functions of the malfunction processing circuit 5. The malfunction processing circuit 5 monitors a malfunction of the MCU 2 externally. A monitoring method of the MCU 2 uses a method of monitoring a clock 27 of the MCU 2 and a method of monitoring activities of the monitoring function 23 and the monitoring function 26 of the MCU 2.

That is, the malfunction processing circuit 5 includes a clock 51 independent of the MCU 2 and a clock monitor processing 52, so as to monitor the clock 27 of the MCU 2. The clock monitor processing 52 detects a malfunction of the clock 27 by comparing a clock pulse of the clock 27 to that of the clock 51. The clock 27 serves as a standard clock for a series of operations of the MCU 2, and includes an RC oscillating circuit, a ceramic vibrator, a crystal oscillator, a crystal oscillator embedded oscillator, a crystal oscillator/frequency divider embedded oscillator, etc.

Note that while FIG. 7 shows the case where the clock monitor processing 52 is implemented in a form of software stored in the malfunction processing circuit 5, the clock monitor processing 52 may be implemented as hardware or software in the MCU 2.

Moreover, the malfunction processing circuit 5 includes a pulse monitor processing 53 for monitoring an output pulse from a watchdog timer of the malfunction processing element 32, so as to monitor activity of the monitoring function 23 of the MCU 2. The pulse monitor processing 53 detects an abnormality of the monitoring function 23 by finding that the output pulse does not appear for a predetermined period of time.

Note that while FIG. 7 shows only the case where the monitoring function 23 detects malfunction, the monitoring function 26 (abnormality processing software 42) detects abnormality in the same way.

Namely, a watchdog timer outputs a pulse once the monitoring function 26 (abnormality processing software 42) is performed correctly, and the exterior malfunction processing circuit 5 of the MCU 2 can thus diagnose that the monitoring function 26 is not performed (non-monitored state).

Once at least either the clock monitor processing 52 or the pulse monitor processing 53 of the malfunction processing circuit 5 detects a malfunction of the MCU 2, it outputs an instruction for taking a post-malfunction measure to the actuator driving circuit 4 so as to halt the actuator 12.

As such, this embodiment monitors the MCU comprehensively through three measures: hardware monitoring, software monitoring, and external monitoring, so as to monitor the MCU for abnormality.

In other words, since in the hardware monitoring, a malfunction processing element is arranged for every MCU internal element, and an input/output signal of the MCU internal element is monitored, malfunction of every MCU internal element may be diagnosed carefully.

Moreover, since the malfunction processing element is implemented with a different structure than the MCU internal elements to be monitored, a different delay time up to completion of processing, for example, may be provided. As a result, malfunction factors influencing both elements in common may be detected as malfunction appropriately. Furthermore, since the malfunction processing element made up of a reduced number of transistors is implemented with a simpler structure than the MCU internal element to be monitored, the malfunction processing element may be provided comparatively simply at low cost.

Furthermore, since the software monitoring as well as the hardware monitoring is conducted in the MCU, a malfunction in calculation, which cannot be detected by the malfunction, processing element for hardware monitoring, may be detected.

In the software monitoring, abnormality processing software is arranged as a software element, so as to monitor the calculating result of the software element, and abnormalities of the software element may thus be diagnosed appropriately. Furthermore, since the abnormality processing software is implemented with a different structure than the software element to be monitored, a different instruction, for example, may be used for calculation for the elements. As a result, malfunction factors influencing both elements in common may be detected as malfunction appropriately.

Moreover, since a predetermined permissible range is set up for comparing calculating results, abnormality diagnosis in light of calculation error generated due to simplified structure of the abnormality processing software may be carried out. The permissible range is a limit in which the calculating result of the monitored software element and that of the abnormality processing software have the same sign, and the absolute value of the calculating result of the monitored software element is smaller than absolute value from the abnormality processing software. This allows even a case where there is a comparatively large difference between the calculating result of the monitored software element and that of the abnormality processing software when the calculating result of the monitored software element is a value that may not lead to a malfunction and the actual control action of the actuator is small. Therefore, excessive abnormality diagnosis may be prevented.

Once a malfunction of the MCU internal element is detected in the hardware monitoring, a measure for suspending the actuator is taken. Meanwhile, once an abnormality of the software element is detected in the software monitoring, correction for restricting the calculating result of the software element within the permissible range is performed, and a measure for continuing drive-control of the actuator is taken.

The electronic control MCU embedded in a vehicle is generally halted when an abnormality occurs irrespective of the details of the abnormality. However, from the viewpoint of the driver's burden due to enlarged vehicles when the control halts and standardization of vehicle safety control etc., it is necessary to continue control if an abnormality occurs depending on details of the abnormality. Since the embodiment can diagnose an abnormality of the MCU carefully, appropriate measure may be taken, such as suspending or continuing control according to the details of the abnormality.

Furthermore, since external monitoring or monitoring a malfunction of the MCU from the outside of the MCU is performed, factors influencing both of the MCU's monitoring functions, the hardware monitoring and the software monitoring, may be diagnosed.

For example, a clock independent of the MCU may be deployed outside the MCU, so as to monitor the clock of the MCU. If the MCU cannot diagnose either malfunction or abnormality and a clock abnormality influencing the monitoring functions of the MCU has occurred, it will be detected as an abnormality. Moreover, this may be detected as abnormality by monitoring the output pulse of the watchdog timer, which is provided for each monitoring function inside the MCU, when each monitoring function inside the MCU has stopped. Thus, malfunction of the MCU may be detected outside the MCU.

In this external monitoring, once a malfunction of the MCU is detected by its own monitoring function, or once information indicating that a malfunction of the MCU internal element is detected is obtained from the abnormality processing element, a measure for suspending the actuator will be taken. Namely, when a malfunction of the MCU internal element is detected through hardware monitoring, a means for suspending the actuator directly through hardware monitoring, and a means for suspending the actuator via external monitoring may be used together. As a result, once a malfunction of the MCU internal element occurs, the actuator may be suspended surely.

INDUSTRIAL APPLICABILITY

According to the in-vehicle electronic control device of the present invention, comprehensive monitoring: internal monitoring of the hardware part and the software part in the microcomputer and external monitoring of the microcomputer is possible. This allows detailed, appropriate diagnosis of an abnormality of the microcomputer, and a suitable measure will be taken according to details of the abnormality, which is useful.

REFERENCE SIGNS LIST

1: In-vehicle electronic control device,
2: Microcomputer (MCU),
3: Input I/F circuit,
4: Actuator driving circuit
5: Malfunction processing circuit,
11: Sensor,
12: Actuator,
21: Hardware part
22: Main hardware function,
23: Hardware monitoring function,
24: Software part,
25: Main software function,
26: Software monitoring function,
27: Clock,
31: MCU internal element (main function),
31a: Computing circuit,
32: Malfunction processing element,
32a: Computing circuit,
32b: Comparison circuit,
33: MCU internal element (external output unit),
34: Post-malfunction measure element,
41: Software element
41a: Computing processing,
42: Abnormality processing software,
42a: Computing processing,
42b: Comparison processing,
42c: Restriction processing,
51: Clock,
52: Clock monitor processing,
53: Pulse monitor processing

The invention claimed is:

1. An in-vehicle electronic control device, comprising:
a hardware part and a software part,
a microcomputer configured to generate a driving signal that drives an actuator based on a signal detected by a sensor installed in a vehicle,
a hardware element monitoring unit that is deployed in the microcomputer and monitors an abnormality of each element of the hardware part,
a software element monitoring unit that is deployed in the microcomputer and monitors an abnormality of each element of the software part, and
an external monitoring unit that is deployed outside the microcomputer and monitors an abnormality of the microcomputer, wherein
the hardware element monitoring unit has a different configuration from that of a to-be-monitored hardware element, comprises a monitoring hardware element that has the same input/output characteristics as the to-be-monitored hardware element, and compares an output signal from the to-be-monitored hardware element and an output signal from the monitoring hardware element when an identical signal is input to both of the to-be-monitored hardware element and the monitoring hardware element, so as to monitor an abnormality of the to-be-monitored hardware element.

2. The in-vehicle electronic control device of claim 1, wherein when the hardware element monitoring unit detects the abnormality, the hardware element monitoring unit takes a stop measure for halting the actuator.

3. The in-vehicle electronic control device of claim 1, wherein when the hardware element monitoring unit detects the abnormality, the hardware element monitoring unit notifies the abnormality to the external monitoring unit; and the external monitoring unit receives the notification of the abnormality from the hardware element monitoring unit, and the external monitoring unit takes a stop measure for halting the actuator.

4. An in-vehicle electronic control device, comprising:
a hardware part and a software part;
a microcomputer configured to generate a driving signal that drives an actuator based on a signal detected by a sensor installed in a vehicle;
a hardware element monitoring unit that is deployed in the microcomputer and monitors an abnormality of each element of the hardware part;
a software element monitoring unit that is deployed in the microcomputer and monitors an abnormality of each element of the software part; and
an external monitoring unit that is deployed outside the microcomputer and monitors an abnormality of the microcomputer, wherein
the software element monitoring unit has a different configuration from that of a to-be-monitored software element, has a monitoring software element for the same computing as the to-be-monitored software element, inputs the same signal to the to-be-monitored software element and the monitoring software element, and monitors an abnormality of the to-be-monitored software element by determining whether a difference between the calculated results from both the to-be-monitored software element and the monitoring software element falls within a permissible range.

5. The in-vehicle electronic control device of claim 4, wherein the permissible range is a range in which the calculating result of the monitored software element and calculating result of the monitoring software element have the same sign, and where absolute value of the calculating result of the monitored software element is smaller than that of the calculating result of the monitoring software element.

6. The in-vehicle electronic control device of claim 4, wherein the software element monitoring unit comprises a restriction unit for restricting the computing result of the monitored software element within the permissible range once the abnormality is detected.

7. The in-vehicle electronic control device of claim 1, wherein the external monitoring unit monitors a clock of the microcomputer, so as to monitor abnormality of the microcomputer.

8. The in-vehicle electronic control device of claim 1, wherein the external monitoring unit monitors activity of the hardware element monitoring unit and activity of the software element monitoring unit, so as to monitor abnormality of the microcomputer.

9. The in-vehicle electronic control device of claim 1, wherein once the external monitoring unit detects the abnormality, the external monitoring unit takes measure to halt the actuator.

* * * * *